United States Patent
Hayashi et al.

(10) Patent No.: US 8,413,596 B2
(45) Date of Patent: Apr. 9, 2013

(54) OXYFUEL BOILER AND A METHOD OF CONTROLLING THE SAME

(75) Inventors: Yoshiharu Hayashi, Hitachinaka (JP); Akihiro Yamada, Tokai (JP); Tsuyoshi Shibata, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 830 days.

(21) Appl. No.: 12/581,724

(22) Filed: Oct. 19, 2009

(65) Prior Publication Data
US 2010/0101462 A1    Apr. 29, 2010

(30) Foreign Application Priority Data
Oct. 27, 2008 (JP) .................. 2008-275034

(51) Int. Cl.
  *F23N 5/02*    (2006.01)
(52) U.S. Cl. .............. 110/190; 110/297; 110/348
(58) Field of Classification Search ......... 110/185, 110/186, 188, 190, 204, 205, 263, 297, 348; 165/287, 288, 289, 292, 294, 296, 297, 298, 165/299, 300; 431/6, 8, 9, 10, 11, 12, 75; 236/14, 15 R, 15 BD, 15 BR; 122/14.1, 14.2, 122/14.22, 479.1, 479.2
See application file for complete search history.

(56) References Cited

U.S. PATENT DOCUMENTS

| | | | |
|---|---|---|---|
| 5,764,535 A * | 6/1998 | Okazaki et al. ........... | 700/274 |
| 2009/0272300 A1* | 11/2009 | Yamada et al. ........... | 110/190 |
| 2011/0014578 A1 | 1/2011 | Rohde et al. | |

FOREIGN PATENT DOCUMENTS

| | | |
|---|---|---|
| DE | 10 2005 025 334 A1 | 12/2006 |
| DE | 10 2008 009 129 A1 | 8/2009 |
| EP | 1 959 193 A1 | 8/2008 |
| JP | 2000-039105 | 2/2000 |
| JP | 2001-235103 | 8/2001 |
| JP | 2007-147162 | 5/2007 |

OTHER PUBLICATIONS

Thomas Wild et al., "Feuerungen in Oxyfuel-Dampferzeugern", VGB PowerTech, Nov. 1, 2010, pp. 32-39, vol. 90, No. 11, XP001559024.

European Search Report dated Apr. 11, 2012 (Six (6) pages).

* cited by examiner

*Primary Examiner* — Kenneth Rinehart
*Assistant Examiner* — David J Laux
(74) *Attorney, Agent, or Firm* — Crowell & Moring LLP

(57) ABSTRACT

An oxyfuel boiler 1 is equipped with an oxygen separation apparatus 23 to produce oxygen by separating oxygen from the air, a recirculation fan 26 to supply a portion of combustion flue gas branched from the combustion flue gas discharged from the boiler to the oxyfuel boiler 1, a temperature sensor 14a to detect gas temperature at a boiler outlet 1d in the oxyfuel boiler 1, and a control apparatus 150 to calculate gas temperature at a furnace outlet 1c in the boiler from the gas temperature at the boiler outlet 1d detected by the temperature sensor 14a and control the operating condition of the recirculation fan 26 so that the calculated gas temperature at the furnace outlet 1c becomes a desired preset gas temperature.

8 Claims, 3 Drawing Sheets

OXYFUEL BOILER AND A METHOD OF CONTROLLING THE SAME

CLAIM OF PRIORITY

The present application claims priority from Japanese patent application serial No. 2008-275034, filed on Oct. 27, 2008, the content of which is hereby incorporated by reference into this application.

BACKGROUND OF THE INVENTION

1. Field of the Invention

The present invention relates to a coal thermal power plant with the aim of carbon dioxide capture and storage, and specifically relates to an oxyfuel boiler suitable for the carbon dioxide capture and storage in coal thermal power plants and a method of controlling the oxyfuel boiler.

2. Description of Related Art

As countermeasures against global warming, efforts to reduce emissions of CO2 (carbon dioxide) which is one of greenhouse gases have been actively implemented worldwide. A thermal power plant is one of such facilities that emit a large quantity of CO2, and in particular, a coal thermal power plant equipped with a coal boiler for burning coal, which contains a large amount of carbon and generates a large quantity of CO2 in the combustion flue gas, emits the largest amount of CO2 per electricity generated, and therefore, urgent CO2 reduction measures are required to be made.

In addition to the increase in efficiency in power generation, CO2 reduction measures in the coal thermal power plant include the carbon dioxide separation and capture and storage from the combustion flue gas generated by combustion in the coal boiler. The carbon dioxide separation and capture and storage is a process in which only CO2 is separated from the combustion flue gas generated in the coal thermal power plant, compressed, liquefied, and the liquefied CO2 is then sent through pipelines and stored in the deep underground.

Methods of carbon dioxide separation and capture and storage from the combustion flue gas applied to a coal thermal power plant can be roughly classified into three categories: (1) pre-combustion, (2) post-combustion, and (3) oxyfuel combustion.

The pre-combustion in method (1) is a method of carbon dioxide capture and storage from a gas mixture of H2 (hydrogen) and CO2 obtained by a reaction between coal and water steam by the physical absorption method or the like and using the remaining H2 as a fuel. Since the fuel is H2, combustion of the fuel will not generate CO2.

The post-combustion in method (2) is a method of using a membrane separation method or the like for carbon dioxide capture and storage from the combustion flue gas obtained by coal combustion in the ordinary atmospheric air (called as air combustion). In this case, major components of the combustion flue gas are N2 (nitrogen) contained in the air and CO2 generated by combustion, and those components are separated and only CO2 is captured and stored.

In contrast to the above-mentioned two carbon dioxide separation and capture and storage methods, the oxyfuel combustion in method (3) is configured such that oxygen is separated from air, and the separated pure oxygen is supplied to a coal boiler to burn fuel coal so that the coal boiler can be used as an oxyfuel boiler, then, a part of the combustion flue gas (whose major component is CO2) generated by burning coal in the oxyfuel boiler is mixed with pure oxygen, and the mixed gas is supplied to the oxyfuel boiler as oxidizing gas, thereby burning coal.

Since combustion flue gas generated in the air fired boiler contains a large amount of nitrogen (N2), it is necessary to separate carbon dioxide (CO2) from the combustion flue gas discharged from the air fired boiler. However, because most of combustion flue gas components generated in the oxyfuel boiler is CO2, the CO2 can be directly captured and stored without taking the step of separating CO2 from the flue gas.

The reason why CO2 is mixed with oxygen to form the oxidizing gas supplied to the oxyfuel boiler is to inhibit the increase in temperature of the flame burning in the coal boiler.

Because the temperature of the flame burning in the coal boiler is high during the combustion in which only oxygen is supplied to the coal boiler to burn powdered coal (pure oxygen combustion), expensive heat-resistant steel is necessary as boiler material, and the flow rate of the oxidizing gas blown out through a burner located in the coal boiler decreases, making the formation of the flame difficult. Therefore, pure oxygen combustion is not implemented in the coal boiler.

When retrofitting a coal boiler from an air combustion type to an oxygen combustion type due to the above circumstances, if the balance of heat absorption quantity in the oxygen combustion can be made equivalent to the balance of heat absorption quantity in the air combustion, retrofitting to change the area of heat transfer becomes unnecessary, which can significantly reduce the retrofit cost of the boiler.

As stated above, because the oxyfuel boiler can change the balance of heat absorption quantity in the heat exchangers and the entire heat storage quantity in the boiler by adjusting the concentration of oxygen contained in the oxidizing gas, adopting a control method which can create a condition similar to air combustion by taking advantage of that characteristic can be one idea to be considered.

For example, in a control method disclosed in Japanese Patent Laid-open No. 2007-147162, concentration of oxygen contained in the oxidizing gas is adjusted by presetting a target value of heat storage quantity in the boiler according to a load request and controlling the amount of circulating flue gas so that the actual heat storage quantity becomes the target value. Herein, the target value is set to become equivalent to the predetermined target heat storage quantity in an existing air fired boiler. Also, a preset value according to a load request is set for the oxygen supply quantity.

[Patent document 1] Japanese Patent Laid-open No. 2007-147162

SUMMARY OF THE INVENTION

However, in the method of controlling an oxyfuel boiler where oxygen is burned in a coal boiler, as described in the Japanese Patent Laid-open No. 2007-147162, the amount of oxygen supplied to the coal boiler is controlled to become a preset value according to a boiler load, and also the amount of circulating flue gas is controlled so that the heat storage quantity in the boiler becomes equivalent to that of an existing air fired boiler. Therefore, if concentration of oxygen supplied to the coal boiler is changed by controlling the amount of oxygen as stated above, temperature of gas in a furnace of the coal boiler will also change accordingly.

For this reason, if concentration of oxygen supplied to the coal boiler is increased so that the heat storage quantity in the boiler satisfies the target value equivalent to that of an existing air fired boiler, the gas temperature in the furnace of the coal boiler also increases, which may result in exceeding the boiler's design limiting point or insufficient margin for the limiting point.

Further, when heat storage efficiency in the coal boiler decreases due to deterioration with age, control is performed to increase concentration of oxygen supplied to compensate for the decrease in the heat storage efficiency in the boiler. Therefore, gas temperature in the furnace of the coal boiler also increases accordingly, and heat-resistance of the material of the coal boiler further deteriorates.

Further, gas temperature at the furnace outlet in the coal boiler is designed to be maintained at the melting point of ash or lower to prevent slagging on the rear heat transfer surface. However, as the concentration of supplied oxygen increases, the margin for the restriction will decrease.

An object of the present invention is to provide an oxyfuel boiler and a method of controlling the oxyfuel boiler which can reduce retrofit cost needed for converting a coal boiler operating as an existing air fired boiler to an oxyfuel boiler, prevent the oxyfuel boiler from deteriorating and slagging due to high-temperature gas, and operate stably and reliably for a long period of time.

In an aspect of the present invention, an oxyfuel boiler having a furnace configured such that oxygen separated from air is mixed with a portion of combustion flue gas branched from combustion flue gas discharged from the boiler, which burns fuel coal to generate steam to be supplied to a steam demand equipment, so as to form oxidizing gas for burning coal, and the oxidizing gas is supplied to the boiler, characterized in that the oxyfuel boiler is further comprising: an oxygen separation apparatus to produce oxygen by separating oxygen from the air, a recirculation fan to supply a portion of combustion flue gas branched from the combustion flue gas discharged from the boiler to the oxyfuel boiler, a temperature sensor disposed at a boiler outlet in the oxyfuel boiler to detect gas temperature of the combustion flue gas, and a control apparatus to calculate gas temperature of the combustion flue gas at the furnace outlet in the boiler from the gas temperature of the combustion flue gas at the boiler outlet detected by the temperature sensor and control the operating condition of the recirculation fan so that the calculated gas temperature of the combustion flue gas at the furnace outlet becomes a desired preset gas temperature.

In another aspect of the present invention, an oxyfuel boiler having a furnace configured such that oxygen separated from air is mixed with a portion of combustion flue gas branched from combustion flue gas discharged from the boiler, which burns fuel coal to generate steam to be supplied to a steam demand equipment, so as to form oxidizing gas for burning coal, and the oxidizing gas is supplied to the boiler, characterized in that the oxyfuel boiler is further comprising: an oxygen separation apparatus to produce oxygen by separating oxygen from the air, a recirculation fan to supply a portion of combustion flue gas branched from the combustion flue gas discharged from the boiler to the oxyfuel boiler, a temperature sensor and an oxygen sensor disposed at boiler outlet in the oxyfuel boiler to detect gas temperature and oxygen concentration of the combustion flue gas, a control apparatus to calculate gas temperature of the combustion flue gas at the furnace outlet in the boiler from the gas temperature of the combustion flue gas at the boiler outlet detected by the temperature sensor and control the operating condition of the recirculation fan so that the calculated gas temperature of the combustion flue gas at the furnace outlet becomes a desired preset gas temperature, and the control apparatus controls the operating condition of the oxygen separation apparatus so that oxygen concentration at the boiler outlet detected by the oxygen sensor becomes a desired preset oxygen concentration.

In another aspect of the present invention, a method of controlling an oxyfuel boiler having a furnace configured such that oxygen separated from the air is mixed with a portion of combustion flue gas branched from the combustion flue gas discharged from a boiler, which burns fuel coal to generate steam to be supplied to a steam demand equipment, so as to form oxidizing gas for burning coal, and the oxidizing gas is supplied to the boiler, characterized in that the method of controlling the oxyfuel boiler is further comprising the steps of: oxygen mixed into as oxidizing gas supplied to the boiler is produced by separating oxygen from the air by an oxygen separation apparatus, combustion flue gas mixed into as the oxidizing gas supplied to the boiler is a portion of the combustion flue gas discharged from the boiler and supplied by a recirculation fan, the oxidizing gas which is a mixture of the oxygen produced by the oxygen separation apparatus and the combustion flue gas supplied by the recirculation fan is supplied to the oxyfuel boiler to be used for burning coal in the oxyfuel boiler, gas temperature of the combustion flue gas at a furnace outlet in the boiler is calculated by a control apparatus from the gas temperature of the combustion flue gas at the boiler outlet detected by a temperature sensor disposed at the boiler outlet in the oxyfuel boiler, the quantity of the combustion flue gas supplied from the recirculation fan is regulated by the control apparatus so that the calculated gas temperature of the combustion flue gas at the furnace outlet becomes a desired preset gas temperature.

In another aspect of the present invention, a method of controlling an oxyfuel boiler having a furnace configured such that oxygen separated from the air is mixed with a portion of combustion flue gas branched from the combustion flue gas discharged from a boiler, which burns fuel coal to generate steam to be supplied to a steam demand equipment, so as to form oxidizing gas for burning coal, and the oxidizing gas is supplied to the boiler, characterized in that the method of controlling the oxyfuel boiler is further comprising the steps of: oxygen mixed into as oxidizing gas supplied to the boiler is produced by separating oxygen from the air by an oxygen separation apparatus, combustion flue gas mixed into as the oxidizing gas supplied to the boiler is a portion of the combustion flue gas discharged from the boiler and supplied by a recirculation fan, the oxidizing gas which is a mixture of the oxygen produced by the oxygen separation apparatus and the combustion flue gas supplied by the recirculation fan is supplied to the oxyfuel boiler to be used for burning coal in the oxyfuel boiler, gas temperature of the combustion flue gas at a furnace outlet in the boiler is calculated by a control apparatus from the gas temperature of the combustion flue gas at the boiler outlet detected by a temperature sensor disposed at the boiler outlet in the oxyfuel boiler, the quantity of the combustion flue gas supplied from the recirculation fan is regulated by the control apparatus so that the calculated gas temperature of the combustion flue gas at the furnace outlet becomes a desired preset gas temperature, and the quantity of oxygen supplied from the oxygen separation apparatus is regulated by the control apparatus so that the oxygen concentration at the boiler outlet detected by the oxygen sensor disposed at the boiler outlet in the oxyfuel boiler becomes a desired preset oxygen concentration.

According to the present invention, it is possible to reduce retrofit cost to convert a coal boiler operating as an existing air fired boiler to an oxyfuel boiler and prevent the oxyfuel boiler from deteriorating or slagging due to high-temperature gas, and consequently, a highly reliable oxyfuel boiler which can stably operate for a long period of time and a method of controlling the oxyfuel boiler can be achieved.

DETAILED DESCRIPTION OF THE PREFERRED EMBODIMENTS

Hereafter, an oxyfuel boiler, which is an embodiment of the present invention, and a method of controlling the oxyfuel boiler will be explained with reference to the drawings.

Embodiment 1

Figure 1:
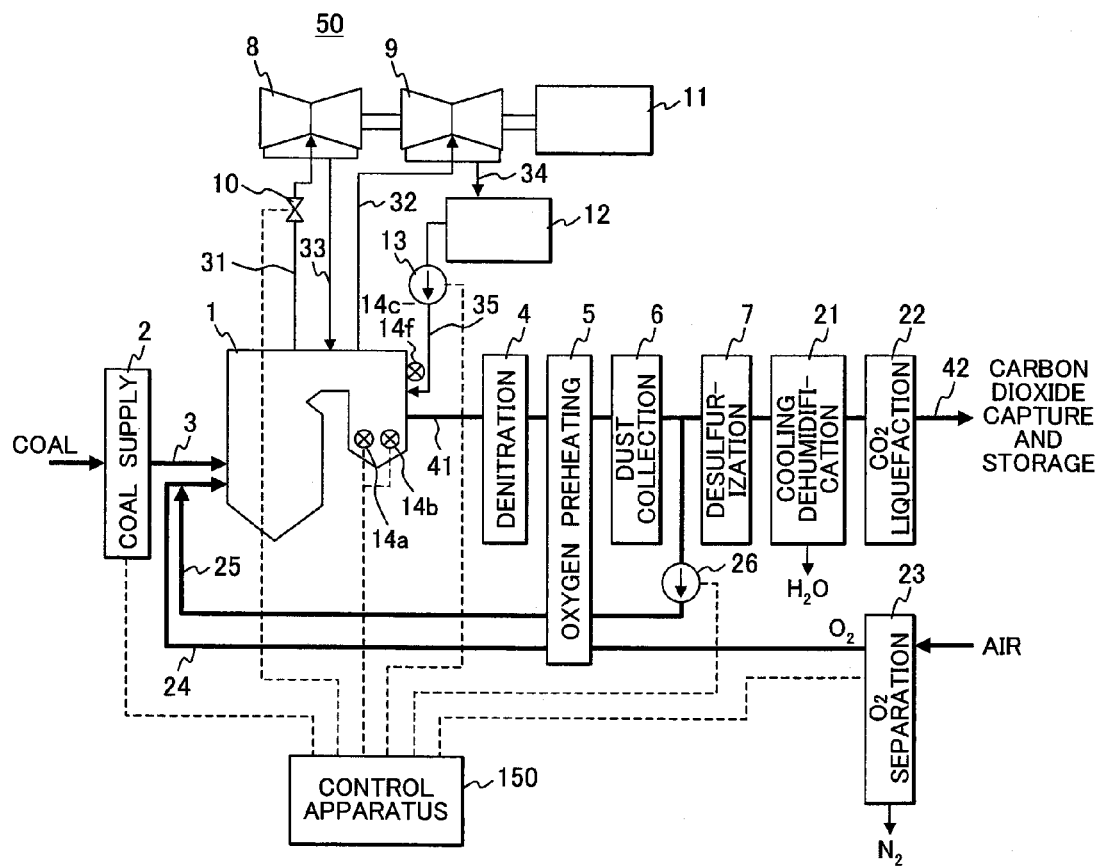
FIG. 1 is a schematic diagram showing a coal thermal power plant equipped with an oxyfuel boiler which is an embodiment of the present invention.

FIG. 1 is a schematic diagram showing the configuration of a coal thermal power plant suitable for the carbon dioxide capture and storage equipped with an oxyfuel boiler which is an embodiment of the present invention.

In FIG. 1, the coal thermal power plant is equipped with an oxyfuel boiler 1 having a furnace which uses powdered coal as a fuel and burns the powdered coal with oxygen separately supplied by a coal boiler. The structure of the oxyfuel boiler 1 is the same as that of an ordinary air fired boiler having a furnace which uses powdered coal as a fuel and burns the powdered coal with supplied air.

Fuel coal is pulverized to powdered coal by a coal supply apparatus 2, and the powdered coal is supplied from the coal supply apparatus 2 through a coal supply line 3 to the furnace of the oxyfuel boiler 1 and burned together with the separately supplied oxygen.

Combustion flue gas generated by burning powdered fuel coal with oxygen in the oxyfuel boiler 1 is introduced as combustion flue gas from the furnace of the oxyfuel boiler 1 through an combustion flue gas line 41 to a denitration apparatus 4 disposed downstream of the oxyfuel boiler 1, and the concentration of nitrogen oxide (NOx) contained in the combustion flue gas discharged from the oxyfuel boiler 1 is reduced to a desired value.

The combustion flue gas flowing down through the denitration apparatus 4 is introduced through the combustion flue gas line 41 to an oxygen preheater 5 disposed downstream of the denitration apparatus 4, and the oxygen preheater 5 uses the heat of the flowing-down combustion flue gas to heat the gas to be supplied to the oxyfuel boiler 1.

The combustion flue gas flowing down through the oxygen preheater 5 is introduced through the combustion flue gas line 41 to a dust collector 6 disposed downstream of the oxygen preheater 5, and the dust collector 6 removes powder dust contained in the combustion flue gas.

Further, the combustion flue gas flowing down through the dust collector 6 is introduced through the combustion flue gas line 41 to a desulfurization apparatus 7 disposed downstream of the dust collector 6, and the desulfurization apparatus 7 reduces the concentration of sulfur oxide (SOx) contained in the combustion flue gas to a desired value.

The oxyfuel boiler 1 is equipped with a plurality of heat exchangers (not shown) which are heated by combustion flue gas flowing down through the oxyfuel boiler 1, thereby generating steam.

Then, high-pressure, high-temperature steam generated in the heat exchangers of the oxyfuel boiler 1 is supplied from the oxyfuel boiler 1 passing through a steam line 31 to a high-pressure steam turbine 8 constructing a steam turbine unit 50 that is a steam demand equipment, thereby driving the high-pressure steam turbine 8. The flow volume of high-pressure steam supplied from the oxyfuel boiler 1 to the high-pressure steam turbine 8 is controlled by a control valve 10 provided in the steam line 31.

Steam discharged after driving the high-pressure steam turbine 8 is supplied through a steam line 33 to the heat exchangers disposed in the oxyfuel boiler 1, and low-pressure, high-temperature steam generated in the heat exchangers reheated by combustion flue gas flowing down through the oxyfuel boiler 1 is supplied from the oxyfuel boiler 1 through a steam line 32 to the low-pressure steam turbine 9 constructing the steam turbine unit 50, thereby driving the low-pressure steam turbine 9.

The steam turbine unit 50 is equipped with a generator 11 which rotates by the drive of the high-pressure steam turbine 8 and the low-pressure steam turbine 9, generating electric power. Then, steam discharged after driving the low-pressure steam turbine 9 is introduced through a steam line 34 to a condenser 12 and cooled to become condensed water.

Water condensed by the condenser 12 is pumped by a water supply pump 13 provided in the water supply line 35 and then supplied to heat exchangers, not shown, of the oxyfuel boiler 1 as supply water.

The oxyfuel boiler 1 is equipped with a temperature sensor 14a and an oxygen sensor 14b which measure the temperature of the combustion flue gas and the concentration of oxygen in the combustion flue gas, respectively. The coal thermal power plant equipped with the oxyfuel boiler 1 has a control apparatus 150 to perform various control operations.

Herein, in an actual coal thermal power plant, major devices other than the oxyfuel boiler also have various sensors for measuring state quantities, and the control apparatus 150 transmits control signals to operate the major devices based on the state quantities in the plant measured by various sensors disposed in the major devices constructing the coal thermal power plant. Thus, by this process, the coal thermal power plant operates.

FIG. 1 mainly shows the configuration related to the operation of the oxyfuel boiler 1 in the coal thermal power plant according to this embodiment, and other portions of the configuration are omitted.

Further, major devices constructing the above-mentioned coal thermal power plant are devices also provided in a coal thermal power plant equipped with an ordinary air fired boiler (the oxygen preheater 5 is called an air preheater in an ordinary coal thermal power plant because the preheater heats up air supplied to an air fired boiler).

In a coal thermal power plant equipped with an oxyfuel boiler 1 according to this embodiment, as shown in FIG. 1, a cooling and dehumidifying apparatus 21 which removes water by cooling flue gas flowing down through the desulfurization apparatus 7 is disposed in the combustion flue gas line 41 located on the downstream side of the desulfurization apparatus 7.

The combustion flue gas (mainly CO2) flowing down through the cooling and dehumidifying apparatus 21 and passing through the dust removal, denitration, desulfurization and dehumidification processes is introduced through the combustion flue gas line 41 to a carbon dioxide liquefaction unit 22 disposed downstream of the cooling and dehumidifying apparatus 21, and then CO2 contained in the combustion flue gas is separated, compressed and liquefied in the carbon dioxide liquefaction unit 22.

Liquefied CO2 compressed and liquefied by the carbon dioxide liquefaction unit 22 is sent from the carbon dioxide liquefaction unit 22 through a carbon dioxide capture and storage line 42 to a storage facility, not shown, and is stored therein.

There is provided an oxygen separation apparatus 23 which separates oxygen (O2) and nitrogen (N2) from air taken from the atmosphere. Oxygen separated by the oxygen separation apparatus 23 is supplied through an oxygen supply line 24 to the oxyfuel boiler 1, mixed with recirculating combustion flue gas to form as an oxidizing gas, and the oxidizing gas burns powdered coal supplied from the coal supply line 3 in the oxyfuel boiler 1.

The oxygen supply line 24 is designed to supply pure oxygen separated by the oxygen separation apparatus 23 or oxygen (which contains a trace of nitrogen and the like as impurities) through an oxygen preheater 5 to the oxyfuel boiler 1. Therefore, the pure oxygen or oxygen is preheated in the oxygen preheater 5 by the combustion flue gas flowing down through the combustion flue gas line 41, subsequently supplied through the oxygen supply line 24 to the oxyfuel boiler 1, and used to burn the powdered coal. Furthermore, after oxygen has been separated from air by the oxygen separation apparatus 23, the remaining gas (mainly N2) is discharged outside of the line.

In a coal thermal power plant equipped with an oxyfuel boiler according to this embodiment, there is provided a recirculation line 25 which branches from the combustion flue gas line 41 between the dust collector 6 and the desulfurization apparatus 7, introduces a portion of combustion flue gas, and recirculates the combustion flue gas in the oxyfuel boiler 1.

The recirculation line 25 is equipped with a recirculation fan 26 which is designed to transport a portion of the combustion flue gas branched from the combustion flue gas line 41 to the oxyfuel boiler 1 to be used as the recirculating flue gas. Because the recirculation line 25 is designed to supply the recirculating combustion flue gas through the oxygen preheater 5 to the oxyfuel boiler 1, the recirculating combustion flue gas is heated by the combustion flue gas flowing down through the combustion flue gas line 41 in the oxygen preheater 5, subsequently supplied through the recirculation line 25 to the oxyfuel boiler 1, mixed with oxygen supplied through the oxygen supply line 24 to form oxidizing gas, and the oxidizing gas burns powdered coal supplied by the coal supply line 3 in the oxyfuel boiler 1.

As stated above, the oxidizing gas supplied to the oxyfuel boiler 1 is a mixture of pure oxygen supplied from the oxygen supply line 24 and recirculating combustion flue gas supplied through the recirculation line 25.

In the control apparatus 15, the amount of pure oxygen supply is regulated by controlling the operation of the oxygen separation apparatus 23 according to the command signal calculated by the control apparatus 15, while the amount of circulating flue gas is regulated by controlling the number of revolutions of the recirculation fan 26 according to the command signal calculated by the control apparatus 15. Thus, control is performed so that concentration of oxygen contained in the oxidizing gas, which is a mixture of pure oxygen and circulating combustion flue gas, becomes a desired value.

The amount of oxidizing gas supplied to the oxyfuel boiler 1 is the sum of the amount of pure oxygen supply and the amount of circulating combustion flue gas. Further, oxygen contained in the oxidizing gas is a mixture of oxygen supplied from the oxygen separation apparatus 23 and a trace of oxygen remaining in the circulating combustion flue gas, and supplied to the oxyfuel boiler 1.

Concentration of oxygen in the oxidizing gas supplied to the oxyfuel boiler 1 can be increased by increasing the amount of pure oxygen supply by controlling the operation of the oxygen separation apparatus 23 or decreasing the amount of circulating combustion flue gas by controlling the number of revolutions of the recirculation fan 26.

On the other hand, the quantity of fuel coal supplied to the oxyfuel boiler 1 can be adjusted by controlling the operation of the coal supply apparatus 2.

The above-mentioned control means adjusts the amount of oxygen supply, amount of circulating combustion flue gas, and the amount of coal supply which are parameters for controlling the combustion condition in the oxyfuel boiler 1.

In a coal thermal power plant equipped with an oxyfuel boiler according to this embodiment, concentration of oxygen contained in the oxidizing gas supplied to the oxyfuel boiler 1 is controlled by the use of gas temperature in the oxyfuel boiler 1, for example, gas temperature at a furnace outlet 1c of the oxyfuel boiler 1 as a reference to determine the concentration of oxygen contained in the oxidizing gas.

In most cases, gas at the furnace outlet 1c of the oxyfuel boiler 1 is too hot for a temperature sensor to be disposed. For this reason, gas temperature at the furnace outlet 1c is calculated according to thermal balance based on an actual value measured by a temperature sensor disposed in a different location.

Figure 2:
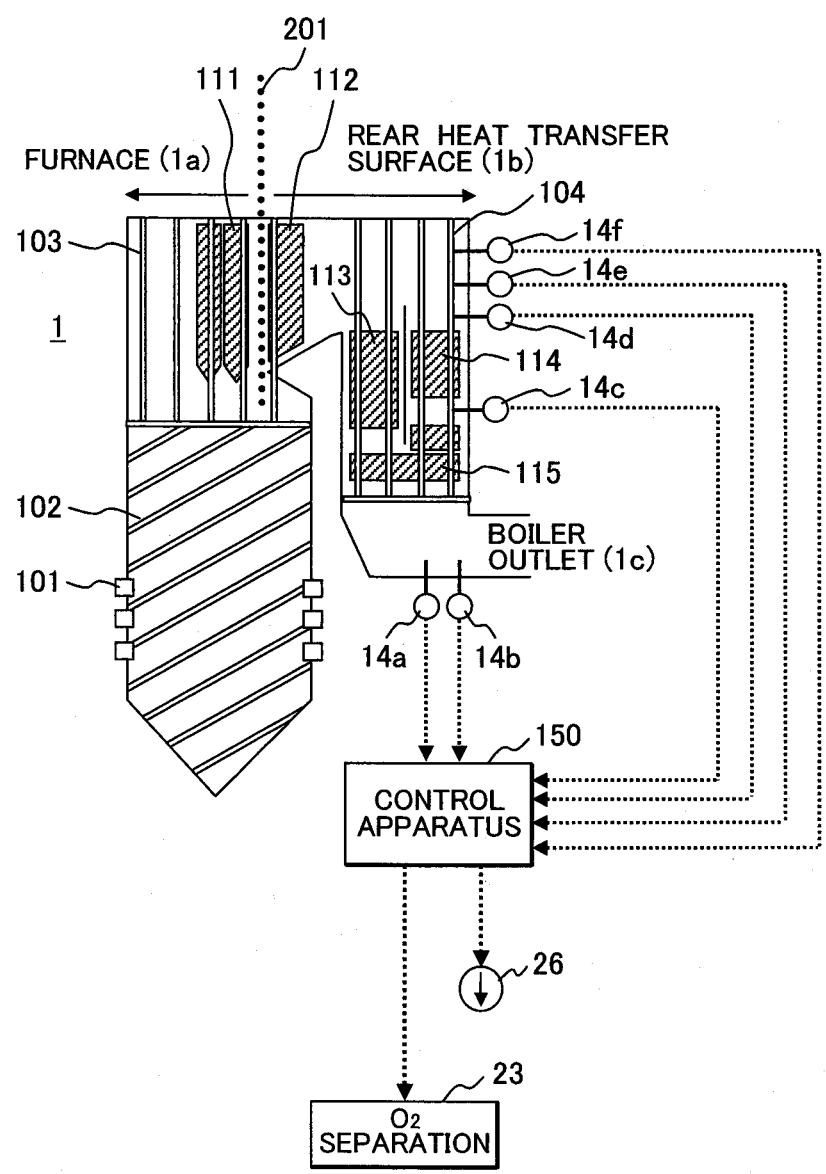
FIG. 2 is a schematic cross-sectional view showing the configuration of an oxyfuel boiler according to an embodiment shown in FIG. 1.

In a coal thermal power plant equipped with an oxyfuel boiler according to this embodiment, in the oxyfuel boiler 1 which burns powdered coal, the furnace outlet 1c is located in the boundary 201 between the furnace 1a and the rear heat transfer surface 1b, as shown in FIG. 2, and the upstream side of the boundary 201 is called a furnace 1a and the downstream side is called a rear heat transfer surface 1b.

A combustion burner 101 is disposed at the lower portion of the furnace 1a shown in FIG. 2, and powdered coal supplied from the combustion burner 101 is burned with oxidizing gas which is a mixture of oxygen and recirculating combustion flue gas, thereby generating high-temperature combustion gas.

Structurally, high-temperature combustion gas flows down through the furnace 1a toward the boiler outlet 1d while transferring heat to steam which flows through a plurality of heat exchangers made up of water tubes provided in the oxyfuel boiler 1.

A water tube called a spiral tube 102 is disposed spirally on the lower wall surface of the furnace 1a, while a water tube called an open-path tube 103 is disposed vertically on the upper wall surface of the furnace 1a. The spiral tube 102 and the open-path tube 103 are collectively referred to as a water wall.

Further, a water tube 104 called a cage wall is disposed on the wall surface on the rear heat transfer surface 1b side shown in FIG. 2. The water wall and the cage wall are water tubes located on the wall surface, while a plurality of heat exchangers made up of water tubes are located inside the oxyfuel boiler 1.

Among those heat exchangers, a secondary superheater 111 is suspended from the ceiling of the furnace 1a. Further, on the downstream side of the secondary superheater 111, heat exchangers of tertiary superheater 112, reheater 113, primary superheater 114, and economizer 115 are sequentially disposed along the direction of the combustion gas flow.

In a coal thermal power plant equipped with an oxyfuel boiler 1 according to this embodiment, the reason why the balance of the heat absorption quantity in the above-mentioned heat exchangers changes as the result of adjustments to the concentration of oxygen contained in the oxidizing gas, which is a mixture of pure oxygen supplied from the oxygen supply line 24 to the oxyfuel boiler 1 and recirculating combustion flue gas supplied through the recirculation line 25, is that forms of heat transfer, such as convection heat transfer and radiation heat transfer, are related.

Convection heat transfer is a phenomenon in which heat transfers on the contact surface between high-temperature combustion gas and a water tube due to a temperature difference therebetween. On the other hand, radiation heat transfer is a phenomenon in which electromagnetic waves generated from high-temperature combustion gas are absorbed by a water tube and then converted to thermal energy, and thus, heat is transferred.

Both the convection heat transfer and the radiation heat transfer always act on the heat transfer from the combustion gas in the boiler to the heat exchangers. In areas such as in the furnace 1a where the temperature of combustion gas is high, radiation heat transfer becomes dominant, and in areas such as on the rear heat transfer surface 1b where the temperature of combustion gas is comparatively low, convection heat transfer becomes dominant. This is attributed to a physical property of the radiation heat transfer quantity being proportional to the fourth power of gas temperature.

For this reason, in an oxyfuel boiler 1, if concentration of oxygen contained in the oxidizing gas is increased by reducing the amount of circulating combustion flue gas supplied through the recirculation line 25 to the oxyfuel boiler 1, flame temperature in the furnace 1a increases, which increases the radiation heat transfer quantity in the furnace 1a as well as increases the amount of heat absorption on the furnace 1a side.

On the other hand, when the amount of circulating combustion flue gas supplied through the recirculation line 25 to the oxyfuel boiler 1 decreases, the volume of the gas flowing through the oxyfuel boiler 1 decreases, causing the velocity of the gas flow to decrease. At this point in time, the abovementioned convection heat transfer has a physical property of the heat transfer quantity decreasing with the decrease in the velocity of gas flow.

Therefore, if concentration of oxygen contained in the oxidizing gas is increased by reducing the amount of circulating combustion flue gas supplied through the recirculation line 25 to the oxyfuel boiler 1, the amount of heat absorption decreases on the rear heat transfer surface 1b where the convection heat transfer is dominant.

That is, in the oxyfuel boiler 1, if concentration of oxygen contained in the oxidizing gas is increased by reducing the amount of circulating combustion flue gas supplied to the oxyfuel boiler 1, the amount of heat absorption increases on the furnace 1a side where the radiation heat transfer is dominant, while the amount of heat absorption decreases on the rear heat transfer surface 1b side where the convection heat transfer is dominant.

Further, if concentration of oxygen contained in the oxidizing gas is decreased by increasing the amount of circulating combustion flue gas supplied to the oxyfuel boiler 1, the above action will occur in reverse.

According to the above-mentioned phenomena, it is possible to change the balance of the heat absorption quantity in the heat exchangers disposed in the oxyfuel boiler 1 by adjusting the concentration of oxygen contained in the oxidizing gas supplied to the oxyfuel boiler 1.

Further, in the case of a general air fired boiler, the overall heat storage quantity in the boiler which joins the furnace 1a side and the rear heat transfer surface 1b side tends to increase by decreasing the amount of circulating combustion flue gas and simultaneously increasing the oxygen concentration. This is because heat transfer efficiency increases as the gas temperature increases.

When retrofitting an existing air fired boiler which burns powdered coal with air to an oxyfuel boiler 1 which burns powdered coal with oxygen, in terms of retrofit cost, it is preferable that the balance of the heat absorption quantity in each heat exchanger in oxygen combustion be equivalent to that in air combustion. This is because material for heat exchangers is selected at the boiler design stage on the basis of the balance of the heat absorption quantity in each heat exchanger (steam temperature and pressure in a water tube, and gas temperature outside the water tube).

In a heat exchanger installed in a boiler, expensive highly heat-resistant material is used in areas of high temperature and inexpensive moderately heat-resistant material is used in areas of comparatively low temperature. For this reason, if the heat absorption balance in oxygen combustion significantly changes from that in air combustion by retrofitting an existing air fired boiler to an oxyfuel boiler, the conditions also change, such as temperature and the like, which are the criteria of selection of material at the design stage. Therefore, it is expected that the boiler cannot be operated as it is in terms of heat resistance of the material.

To cope with such situations, there is an idea of retrofitting each heat exchanger (specifically, addition or deletion of a water tube) provided in the oxyfuel boiler 1 to change the area of heat transfer so that the temperature will become lower than the material's service temperature limit. However, this retrofit presumably requires a considerable amount of cost.

Therefore, in the oxyfuel boiler 1 according to this embodiment provided in a coal thermal power plant, the gas temperature in the oxyfuel boiler 1, which is the gas temperature at a furnace outlet 1c located in the boundary 201 between the furnace 1a and the rear heat transfer surface 1b in FIG. 2, is used as a reference temperature to determine the concentration of oxygen contained in the oxidizing gas supplied to the oxyfuel boiler 1.

Since gas temperature at the furnace outlet 1c is significantly high, it is difficult to directly measure the gas temperature by installing a temperature sensor at the furnace outlet 1c. Therefore, in the control apparatus 150 of the oxyfuel boiler according to this embodiment, as shown in FIG. 2 and FIG. 3, a temperature sensor 14a and a gas composition sensor 14b are provided at a boiler outlet 1d where gas temperature is lower than that at the furnace outlet 1c, and gas temperature and gas composition are measured, respectively, at the boiler outlet 1d where measurement is possible.

Figure 3:
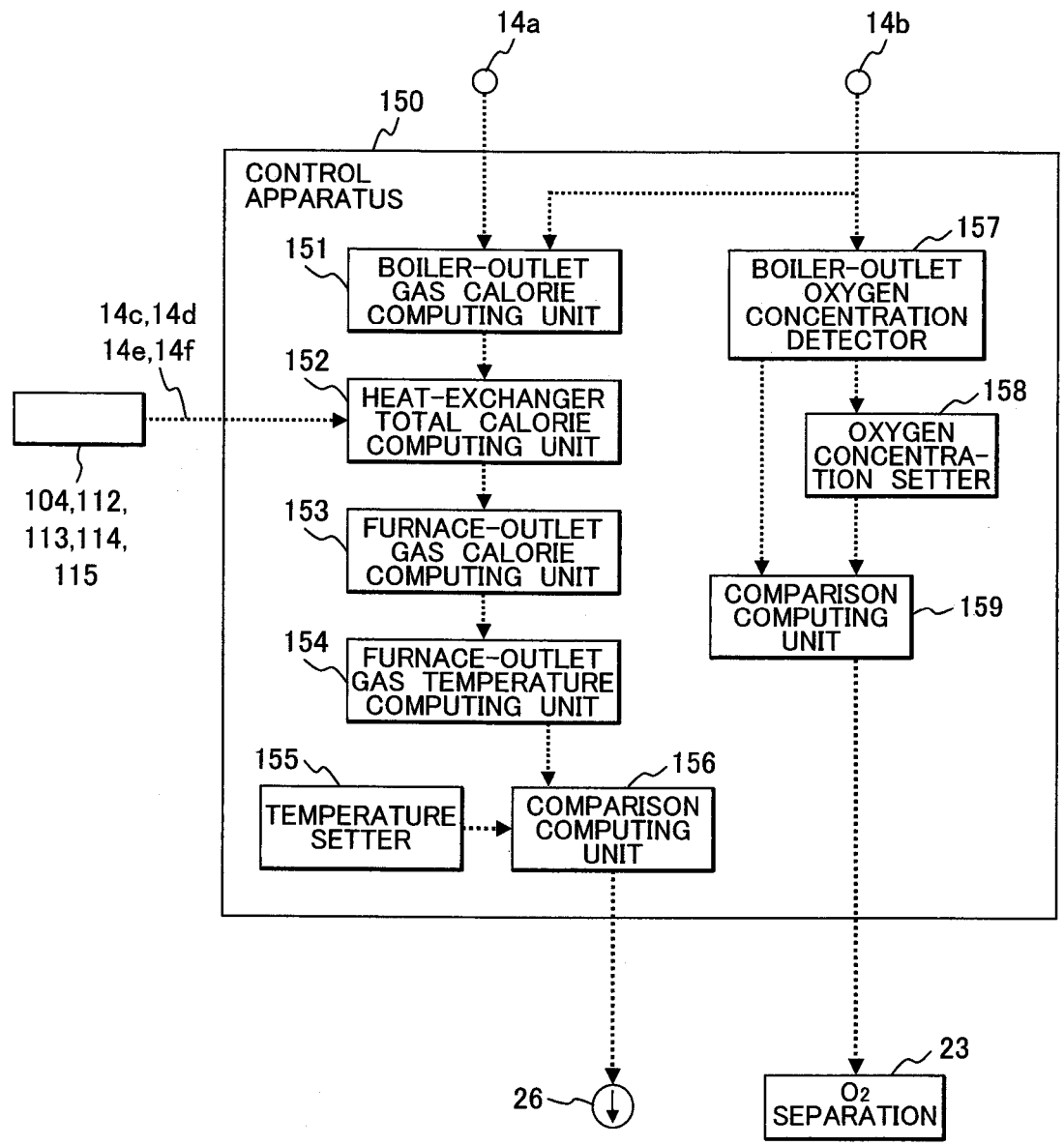
FIG. 3 is a control block diagram showing the configuration of a control apparatus which controls the oxyfuel boiler according to an embodiment shown in FIG. 1.

As shown in FIG. 3, a boiler-outlet gas calorie computing unit 151 for calculating gas calorie at the boiler outlet 1d is provided in the control apparatus 150 for controlling the oxyfuel boiler 1 according to this embodiment. This boiler-outlet gas calorie computing unit 151 calculates gas calorie at the boiler outlet 1d based on the gas temperature and gas composition measured by the temperature sensor 14a and the gas composition sensor 14b, respectively, located at the boiler outlet 1d.

That is, because the boiler-outlet gas calorie computing unit 151 has computing functions for calculating Equation (1) and Equation (2), Equation (1) and Equation (2) are calculated by the computing functions of the boiler-outlet gas calorie computing unit 151 based on the gas temperature and gas composition measured by the temperature sensor 14a and the gas composition sensor 14b, respectively, located at the boiler outlet 1d, thereby calculating gas calorie at the boiler outlet 1d.

[Equation 1]

$$H_{g2,i} = f_i(T_{g2}) \quad (1)$$

In Equation (1), $H_{g2,i}$ represents gas enthalpy of substance i at the boiler outlet, $f_i()$ represents a temperature-enthalpy conversion function of substance i in the gas, and $T_{g2}$ represents gas temperature at the boiler outlet.

[Equation 2]

$$Q_{g2} = F_g \times \sum_i (w_i \times H_{g2,i}) \quad (2)$$

In Equation (2), $Q_{g2}$ represents gas calorie at the boiler outlet, $F_g$ represents gas flow volume, $W_i$ represents a mass ratio of substance i in the gas, and $H_{g2,i}$ represents gas enthalpy of substance i at the boiler outlet.

Then, by the calculations using the Equation (1) computing function and the Equation (2) computing function provided in the boiler-outlet gas calorie computing unit 151, gas enthalpy of each substance i (for example, carbon dioxide, oxygen, nitrogen, or water) is obtained from the gas temperature measured by the temperature sensor 14a, thereby calculating gas calorie at the boiler outlet. The temperature-enthalpy conversion function of each substance uses known data conditional on atmospheric pressure. Further, gas composition (weight ratio of each substance contained in the gas) uses a value measured by the gas composition sensor 14b.

The control apparatus 150 is equipped with a heat-exchanger total calorie computing unit 152 to calculate calorie obtained by heat exchangers (cage wall 104, tertiary superheater 112, reheater 113, primary superheater 114, economizer 115, and cage wall 104) located between the furnace outlet and the boiler outlet in the oxyfuel boiler 1 as well as calculate the sum of the calorie.

The heat-exchanger total calorie computing unit 152 provided in the control apparatus 150 has an Equation (3) computing function for calculating total calorie obtained by steam in the heat exchangers. Therefore, Equation (3) is calculated by the computing function of the heat-exchanger total calorie computing unit 152 based on each value of the inlet steam temperature, outlet steam temperature, steam pressure and steam flow volume measured by an inlet temperature sensor 14c, outlet temperature sensor 14d, pressure sensor 14e, and a flow volume sensor 14f, respectively, located in each heat exchanger, thereby calculating total calorie obtained by steam in the heat exchangers.

[Equation 3]

$$Q_w = \sum_j F_{w,j} \times (H_{wout,j} - H_{win,j}) \quad (3)$$

In Equation (3), $Q_W$ represents calorie obtained by heat exchangers located between the furnace outlet and the boiler outlet, $F_{w,j}$ represents steam flow volume of heat exchanger j, $H_{wout,j}$ represents outlet steam enthalpy of heat exchanger j, and $H_{win,j}$ represents inlet steam enthalpy of heat exchanger j.

Then, total calorie obtained by the heat exchangers located between the furnace outlet and the boiler outlet is calculated by the Equation (3) computing function provided in the heat-exchanger total calorie computing unit 152.

Enthalpy of steam is obtained by converting measured values of steam temperature and steam pressure to enthalpy according to the steam table.

The control apparatus 150 is equipped with a furnace-outlet gas calorie computing unit 153 for calculating gas calorie at the furnace outlet 1c based on the total calorie obtained by steam in the heat exchangers calculated by the heat-exchanger total calorie computing unit 152.

The furnace-outlet gas calorie computing unit 153 has an Equation (4) computing function. Therefore, Equation (4) is calculated by the computing function of the furnace-outlet gas calorie computing unit 153 based on the total calorie obtained by heat exchangers calculated by the heat-exchanger total calorie computing unit 152, thereby calculating gas calorie at the furnace outlet 1c.

[Equation 4]

$$Q_{g1} = Q_{g2} + Q_w \quad (4)$$

In Equation (4), $Q_{g1}$ represents gas calorie at the furnace outlet, $Q_{g2}$ represents gas calorie at the boiler outlet, and $Q_W$ represents calorie obtained by heat exchangers located between the furnace outlet and the boiler outlet.

With regard to gas calorie at the boiler outlet 1d, gas calorie at the furnace outlet 1c can be judged as the total calorie obtained by steam through heat exchangers. Herein, calculation target heat exchangers are those located between the furnace outlet 1c and the boiler outlet 1d.

Then, gas calorie at the furnace outlet 1c is calculated using an Equation (4) computing function provided in the furnace-outlet gas calorie computing unit 153.

The control apparatus 150 is further equipped with a furnace-outlet gas temperature computing unit 154 for calculating gas temperature at the furnace outlet 1c based on the gas calorie at the furnace outlet 1c calculated by the furnace-outlet gas calorie computing unit 153.

The furnace-outlet gas temperature computing unit 154 has Equation (5) and Equation (6) computing functions. Therefore, Equation (5) and Equation (6) are calculated by the computing functions of the furnace-outlet gas temperature computing unit 154 based on the gas calorie at the furnace outlet 1c calculated by the furnace-outlet gas calorie computing unit 153, thereby calculating gas temperature at the furnace outlet 1c.

[Equation 5]

$$H_{g1,i} = f_i(T_{g1}) \quad (5)$$

In Equation (5), $H_{g1,i}$ represents gas enthalpy of substance i at the furnace outlet, $f_i()$ represents a temperature-enthalpy conversion function of substance i in the gas, and $T_{g1}$ represents gas temperature at the furnace outlet.

[Equation 6]

$$Q_{g1} = F_g \times \sum_i (w_i \times H_{g1,i}) \quad (6)$$

In Equation (6),
$Q_{g1}$ represents gas calorie at the furnace outlet,
$F_g$ represents gas flow volume,
$W_i$ represents a mass ratio of substance i in the gas, and
$H_{g1,i}$ represents gas enthalpy of substance i at the furnace outlet.

When calculating gas temperature at the furnace outlet 1c using Equation (5) and Equation (6) computing functions provided in the furnace-outlet gas temperature computing unit 154, gas temperature at the furnace outlet 1c is calculated after gas calorie at the furnace outlet 1c has been calculated. At the beginning, gas calorie at the furnace outlet 1c is calculated by providing an initial value as the gas temperature at the furnace outlet 1c, then comparison is made between the calculated gas calorie and the gas calorie at the furnace outlet 1c calculated by Equation (4), and while gas temperature is updated, gas temperature at the furnace outlet 1c is obtained by convergence calculation.

Herein, state quantities of the oxyfuel boiler 1 necessary for calculating gas temperature at the furnace outlet 1c are, as stated above, values measured by the temperature sensor 14a and the gas composition sensor 14b disposed at the boiler outlet 1d.

The control apparatus 150 is equipped with a temperature setter 155 for setting a desired gas temperature at the furnace outlet 1d. The control apparatus 150 is further equipped with a comparison computing unit 156 for comparing the gas temperature at the furnace outlet 1c calculated by the furnace-outlet gas temperature computing unit 154 with a preset gas temperature set by the temperature setter 155 and adjusting the recirculation fan 26 drive condition according to the command signal based on the deviation signal between those two temperature values. Thus, the comparison computing unit 156 is designed to control the amount of circulating combustion flue gas supplied from the recirculation fan 26 to the oxyfuel boiler 1.

Furthermore, the control apparatus 150 is equipped with a boiler-outlet oxygen concentration measuring instrument 157 for detecting oxygen concentration at the boiler outlet 1d from an flue gas composition value at the boiler outlet 1d measured by the gas composition sensor 14b disposed at the boiler outlet 1d, and the control apparatus 150 is also equipped with an oxygen concentration setter 158 for setting a desired oxygen concentration in the combustion flue gas at the furnace outlet 1d.

The control apparatus 150 is further equipped with a comparison computing unit 159 for comparing the calculated oxygen concentration at the boiler outlet 1d detected by the boiler-outlet oxygen concentration measuring instrument 157 with a preset oxygen concentration set by the oxygen concentration setter 158 and adjusting the operating condition of the oxygen supply apparatus 23 by the command signal based on the deviation signal between those two oxygen concentration values. Thus, the comparison computing unit 159 is designed to control volume of oxygen flow supplied from the oxygen supply apparatus 23 to the oxyfuel boiler 1.

Next, control of gas temperature at the furnace outlet by an oxyfuel boiler 1 according to this embodiment will be explained below.

The control apparatus 150 provided in the oxyfuel boiler 1 according to this embodiment, shown FIG. 1 through FIG. 3, controls gas temperature at the furnace outlet 1c as described below.

First, gas calorie at the boiler outlet 1d is calculated by the boiler-outlet gas calorie computing unit 151 provided in the control apparatus 150 based on the gas temperature at the boiler outlet measured by the temperature sensor 14a provided at the boiler outlet 1d and a value measured by the gas composition sensor 14b.

Next, total calorie obtained by the heat exchangers is calculated by the heat-exchanger total calorie computing unit 152 based on a value calculated by the boiler-outlet gas calorie computing unit 151 and the state quantities measured in the heat exchangers.

Next, gas calorie at the furnace outlet 1d is calculated by the furnace-outlet gas calorie computing unit 153 based on the value calculated by the heat-exchanger total calorie computing unit 152, and then, gas temperature at the furnace outlet 1c is calculated by the furnace-outlet gas temperature computing unit 154 based on the value calculated by the furnace-outlet gas calorie computing unit 153.

Then, the comparison computing unit 156 compares gas temperature at the furnace outlet 1c calculated by the furnace-outlet gas temperature computing unit 154 with the preset temperature set by the temperature setter 155, and if the gas temperature at the furnace outlet 1c calculated by the furnace-outlet gas temperature computing unit 154 is lower than the preset temperature set by the temperature setter 155, the command signal based on the deviation signal compared by the comparison computing unit 156 operates to reduce the drive of the recirculation fan 26 which supplies flue gas to the oxyfuel boiler 1. Thus, the amount of recirculating combustion flue gas is decreased and concentration of oxygen contained in the oxidizing gas supplied to the oxyfuel boiler 1 is increased, consequently, the gas temperature at the furnace outlet 1c is controlled to become a desired temperature.

Further, as the result of comparison by the comparison computing unit 156, if gas temperature at the furnace outlet 1c calculated by the furnace-outlet gas temperature computing unit 154 is higher than the preset temperature set by the temperature setter 155, the command signal based on the deviation signal compared by the comparison computing unit 156 operates to enhance the drive of the recirculation fan 26 which supplies combustion flue gas to the oxyfuel boiler 1. Thus, the amount of recirculating combustion flue gas is increased and concentration of oxygen contained in the oxidizing gas supplied to the oxyfuel boiler 1 is decreased, consequently, the gas temperature at the furnace outlet 1c is controlled to become a desired temperature.

Next, complementary control of oxygen concentration at a boiler outlet of the oxyfuel boiler according to this embodiment will be explained below.

The control apparatus 150 provided in the oxyfuel boiler 1 according to this embodiment, shown in FIG. 1 through FIG. 3, complementarily controls oxygen concentration at the furnace outlet 1d as described below.

Oxygen concentration at the boiler outlet 1d is detected by the boiler-outlet oxygen concentration measuring instrument 157 provided in the control apparatus 150 based on the value measured by the gas composition sensor 14b provided at the boiler outlet 1d.

Then, the comparison computing unit 159 compares the oxygen concentration at the boiler outlet 1d detected by the oxygen concentration measuring instrument 157 with the preset oxygen concentration value set by the oxygen concentration setter 158, and if actual oxygen concentration at the boiler outlet 1d detected by the oxygen concentration measuring instrument 157 is lower than the preset oxygen concentration set by the oxygen concentration setter 158, the command signal based on the deviation signal compared by the comparison computing unit 159 operates to increase the operation of the oxygen supply apparatus 23. Thus, the oxygen quantity supplied from the oxygen supply apparatus 23 to the oxyfuel boiler 1 is increased, and the oxygen concentration at the boiler outlet 1d is controlled to become a predetermined concentration.

Further, as the result of comparison by the comparison computing unit 159, if actual oxygen concentration at the boiler outlet 1d detected by the oxygen concentration measuring instrument 157 is higher than the preset oxygen concentration set by the oxygen concentration setter 158, the command signal based on the deviation signal compared by the comparison computing unit 159 operates to reduce the operation of the oxygen supply apparatus 23. Thus, the oxygen quantity supplied from the oxygen supply apparatus 23 to the oxyfuel boiler 1 is decreased, and the oxygen concentration at the boiler outlet 1d is controlled to become a predetermined concentration.

According to the above-mentioned embodiment of the present invention, it is possible to reduce retrofit cost to convert a coal boiler operating as an existing air fired boiler to an oxyfuel boiler and prevent the oxyfuel boiler from deteriorating or slagging due to high-temperature gas, and consequently, a highly reliable oxyfuel boiler which can stably operate for a long period of time and a method of controlling the oxyfuel boiler can be achieved.

INDUSTRIAL APPLICABILITY

The present invention can be applied to an oxyfuel boiler and a method of controlling the oxyfuel boiler suitable for the carbon dioxide capture and storage in a coal thermal power plant.

What is claimed is:

1. An oxyfuel boiler having a furnace configured such that oxygen separated from air is mixed with a portion of combustion flue gas branched from combustion flue gas discharged from the boiler, which burns fuel coal to generate steam to be supplied to a steam demand equipment, so as to form oxidizing gas for burning coal, and the oxidizing gas is supplied to the boiler,
    characterized in that
    the oxyfuel boiler is further comprising:
    an oxygen separation apparatus to produce oxygen by separating oxygen from the air,
    a recirculation fan to supply a portion of combustion flue gas branched from the combustion flue gas discharged from the boiler to the oxyfuel boiler,
    a temperature sensor disposed at a boiler outlet in the oxyfuel boiler to detect gas temperature of the combustion flue gas, and
    a control apparatus to calculate gas temperature of the combustion flue gas at the furnace outlet in the boiler from the gas temperature of the combustion flue gas at the boiler outlet detected by the temperature sensor and control the operating condition of the recirculation fan so that the calculated gas temperature of the combustion flue gas at the furnace outlet becomes a desired preset gas temperature.

2. The oxyfuel boiler according to claim 1, wherein
    an oxygen sensor to detect oxygen concentration of the combustion flue gas is disposed at a boiler outlet in the oxyfuel boiler, and the control apparatus controls the operating condition of the oxygen separation apparatus so that oxygen concentration at the boiler outlet detected by the oxygen sensor becomes a desired preset oxygen concentration.

3. A control apparatus of an oxyfuel boiler according to claim 1, wherein
    the desired preset gas temperature at the furnace outlet in the boiler is determined so that the balance of the heat storage quantity in each heat exchanger located on the rear heat transfer surface in the boiler operating to perform oxygen combustion is almost equivalent to the balance of the heat storage quantity in the each heat exchanger in the boiler operating to perform air combustion.

4. A control apparatus of an oxyfuel boiler according to claim 2, wherein
    the desired preset gas temperature at the furnace outlet in the boiler is determined so that the balance of the heat storage quantity in each heat exchanger located on the rear heat transfer surface in the boiler operating to perform oxygen combustion is almost equivalent to the balance of the heat storage quantity in the each heat exchanger in the boiler operating to perform air combustion.

5. A method of controlling an oxyfuel boiler having a furnace configured such that oxygen separated from the air is mixed with a portion of combustion flue gas branched from the combustion flue gas discharged from a boiler, which burns fuel coal to generate steam to be supplied to a steam demand equipment, so as to form oxidizing gas for burning coal, and the oxidizing gas is supplied to the boiler,
    characterized in that
    the method of controlling the oxyfuel boiler is further comprising the steps of:
    oxygen mixed into as oxidizing gas supplied to the boiler is produced by separating oxygen from the air by an oxygen separation apparatus,
    combustion flue gas mixed into as the oxidizing gas supplied to the boiler is a portion of the combustion flue gas discharged from the boiler and supplied by a recirculation fan,
    the oxidizing gas which is a mixture of the oxygen produced by the oxygen separation apparatus and the combustion flue gas supplied by the recirculation fan is supplied to the oxyfuel boiler to be used for burning coal in the oxyfuel boiler,
    gas temperature of the combustion flue gas at a furnace outlet in the boiler is calculated by a control apparatus from the gas temperature of the combustion flue gas at the boiler outlet detected by a temperature sensor disposed at the boiler outlet in the oxyfuel boiler,
    the quantity of the combustion flue gas supplied from the recirculation fan is regulated by the control apparatus so that the calculated gas temperature of the combustion flue gas at the furnace outlet becomes a desired preset gas temperature.

6. The method of controlling an oxyfuel boiler according to claim 5, wherein
    the quantity of oxygen supplied from the oxygen separation apparatus is regulated by the control apparatus so that the oxygen concentration at the boiler outlet detected by the oxygen sensor disposed at the boiler outlet in the oxyfuel boiler becomes a desired preset oxygen concentration.

7. The method of controlling an oxyfuel boiler according to claim 5, wherein
the desired preset gas temperature at the furnace outlet of the boiler is determined so that the balance of the heat storage quantity in each heat exchanger located on the rear heat transfer surface in the boiler operating to perform oxygen combustion is almost equivalent to the balance of the heat storage quantity in the each heat exchanger in the boiler operating to perform air combustion.

8. The method of controlling an oxyfuel boiler according to claim 6, wherein
the desired preset gas temperature at the furnace outlet of the boiler is determined so that the balance of the heat storage quantity in each heat exchanger located on the rear heat transfer surface in the boiler operating to perform oxygen combustion is almost equivalent to the balance of the heat storage quantity in the each heat exchanger in the boiler operating to perform air combustion.

* * * * *